UNITED STATES PATENT OFFICE.

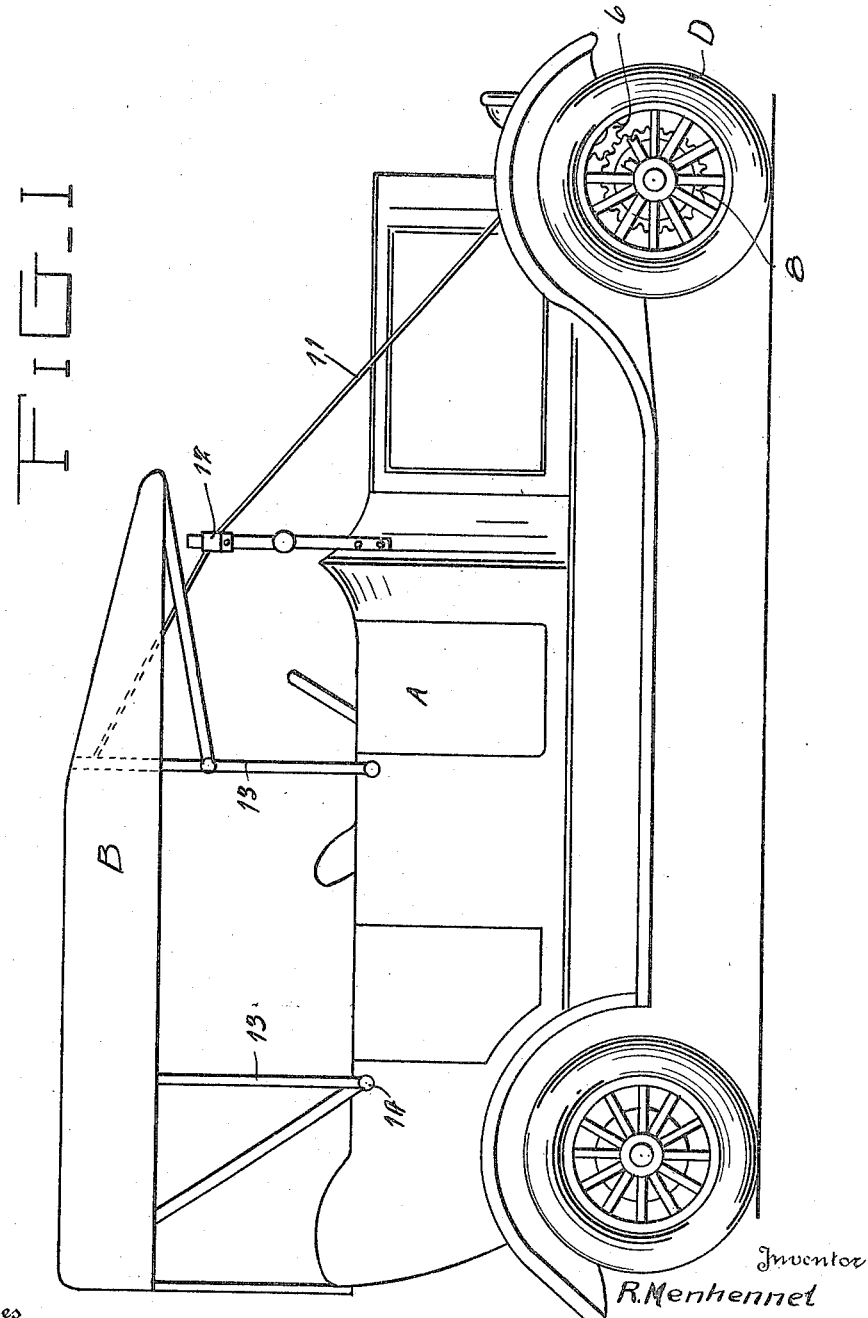

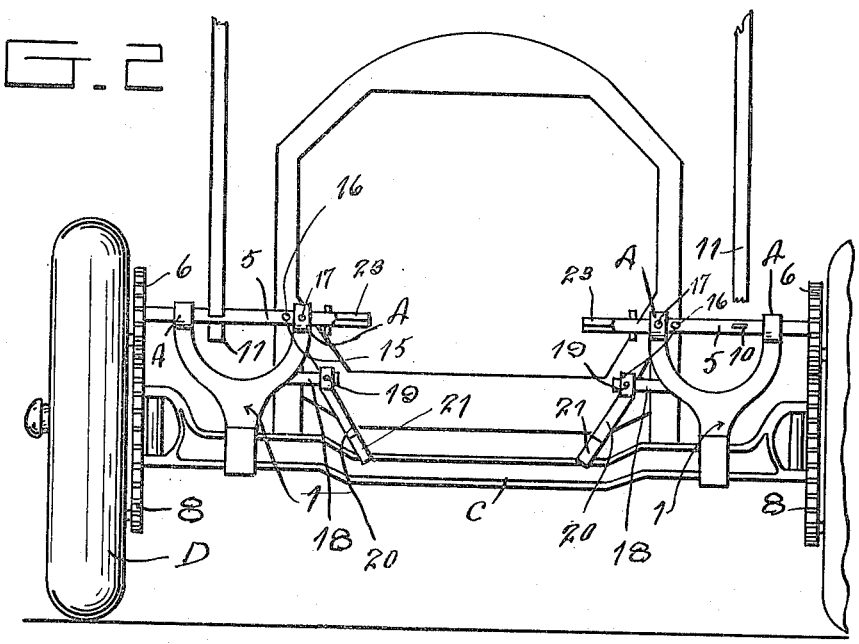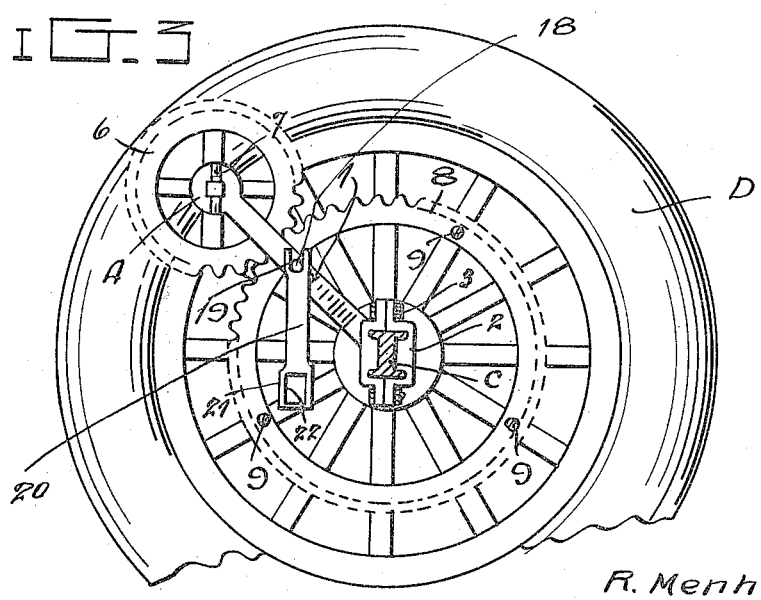

RICHARD MENHENNET, OF PHILADELPHIA, PENNSYLVANIA.

AUTOMOBILE TOP-LIFTER.

1,166,235.  Specification of Letters Patent.  Patented Dec. 28, 1915.

Application filed August 21, 1914. Serial No. 857,916.

*To all whom it may concern:*

Be it known that I, RICHARD MENHENNET, a citizen of the United States, residing at Germantown, Philadelphia, in the county of Philadelphia and State of Pennsylvania, have invented certain new and useful Improvements in Automobile Top-Lifters; and I do hereby declare the following to be a full, clear, and exact description of the invention, such as will enable others skilled in the art to which it appertains to make and use the same.

My invention relates to new and useful improvements in automobiles and resides in the provision of a simple and inexpensive attachment therefor that is arranged to coöperate with the front wheels of the automobile and is operatively connected with the top or canopy of the automobile in such manner that the top may be mechanically drawn into upright position.

Another object is to provide an attachment of the character described that is to be operatively connected with the front wheels of the automobile and will operate when the vehicle is moved to lift the automobile top into such position that the stays thereof may be readily fitted into place in the usual manner, said attachment being arranged to be moved out of coöperation with the wheels when the vehicle is in operation.

Another object is to provide an attachment of the character described that is of simple construction, reliable and efficient in operation and inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of an automobile equipped with my improved top lifting device, Fig. 2 is a front elevation of an automobile partly broken away, and Fig. 3 is a sectional view taken through the front axle of the automobile showing in side elevation the attachment and secured in position.

Referring to the drawings by characters of reference, A designates generally an automobile, B the top or canopy therefor, C the front axle and D the wheels mounted on the front axle.

My improved top lifting attachment consists of a Y-shaped bearing member 1 that is detachably secured to the axle C by means of clamping plates 2 secured to each other by suitable fastening elements 3. The attachment consists of identical mechanism on each side of the car and coöperating with the wheels D at the front of the car. Journaled in bearings 4 formed in the free upper ends of the member 1 are horizontal slidable and rotatable shafts 5. Keyed on the outer ends of said shafts are gear wheels 6. An elongated pin 7 is inserted transversely through the inner end of each of the shafts 5 and serves as a handle and also to prevent said shafts being pulled out of the bearings 4. A skeleton gear wheel 8 provided with peripheral teeth is secured by suitable fastening elements 9 upon the inner face of each of the wheels D and is arranged to coöperate with the adjacent gear wheel 6.

I provide elongated openings 10 in the shafts 5 at points between the bearings 4 on the Y-shaped bearing member 1. These openings are designed to receive the securing straps 11 that are carried at the forward end of the automobile top B. The straps are inserted through the openings 10 and the shafts 5 when rotated exert a pull upon the straps 11. Preferably detachably secured upon the wind shield of the automobile are suitable brackets 12 to guide the straps 11 and support them in such position that the top will be readily pulled into a position that will permit the stays 13 of said top being positioned properly. The top B is pivoted as at 14 in the customary manner to the side of the car and it will thus be seen that when the car is moved forwardly and the straps 11 secured in the openings 10 in the shafts 5, the top will be pulled out of folded position from the rear of the automobile to extended position. The operator may guide the forward part of the top when the top is being raised and it will be readily seen that a great amount of labor will be saved by my improved top lifting attachment.

I provide an opening 15 in each of the shafts 5 at a point adjacent to one of the bearing members 4. This opening is designed to receive a pin 16 which will engage the bearing member 4 adjacent thereto and hold the gear wheel 6 into meshing engagement with the gear wheel 8. An opening 17 is formed in the bearing member that is next adjacent to the opening 15 and when it is desired to move the gear wheel 6 out of mesh with the one 8 the shaft 5 is moved so that the opening 15 registers with the one 17 and the pin 16 is then inserted through the alined opening.

Suitably secured to the inner arm of each of the Y-shaped members 1 at a point intermediate its ends is a suitable stem 18 to the outer end of which is swivelly connected as at 19 the arm 20. This arm is provided with an enlargement 21 at its free terminal and said enlargement is formed with a rectangular aperture 22, the use of which will appear as the description proceeds. The inner ends of the shafts 5 are provided with squared extensions 23 which are arranged to extend into the squared apertures 22 of the enlarged portion 21 in the brackets and thereby coöperate with the arm 20 in holding the shafts 5 against rotation. When the shaft 5 is moved laterally to carry its pinion 6 out of engagement with the gear 8 the arm 20 is swung upwardly into engagement with the squared inner end of the said shaft to hold the latter against rotary movement and retain the top in an elevated position.

To operate the device it is only necessary for the vehicle to be pushed or the engine may be started so that the shafts 5 will rotate. The guide brackets 12 support the straps 11 in such manner that the portions of the straps between the brackets 12 and shafts 5 are nearly vertical thus more of an outward opposed to a downward pull on the top is effected. The device may be readily attached to automobiles without necessitating any material change in the construction thereof.

In practice, I have found that the form of my invention, illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. The combination with an automobile having a pivoted top, of bearing members mounted on the automobile at opposite sides of the same, shafts rotatable and slidable in the bearing members, gear wheels carried by the outer portions of the shaft, gear wheels mounted on the front wheels of the automobile and arranged to mesh with the said gear wheels for rotating the said shafts, the latter being provided with openings to receive flexible connections of the pivoted top and means for holding the shaft against rotary movement when the top is raised.

2. The combination with an automobile having a pivoted top, of bearing members mounted on the automobile at opposite sides thereof, shafts rotatable in the said members and provided with means for connecting them with the straps of the automobile top, gearing for connecting the shafts with the front wheels of the automobile and locking arms pivoted to the bearing members and arranged to swing into engagement with the shaft for holding the same against rotary movement.

3. The combination with an automobile having a pivoted top, of bearing members mounted on the automobile at opposite sides thereof, shafts rotatable and slidable in the said bearing members and provided with inner polygonal ends, said shafts being also provided with means for connecting them with the straps of the automobile top, gearing for connecting the shafts with the wheels of the automobile and arms pivoted to the bearing members below the said shafts and provided with openings arranged to engage with the polygonal ends of the said shafts when the latter are at the limit of their inward movement.

4. An automobile top lifter consisting of bearing members to be secured to the front axle of an automobile, shafts rotatable and slidable in the bearing members, gear wheels keyed on the outer end of the shafts, gear wheels to be carried by the front wheels of an automobile and to mesh with the first gear wheels, means to hold the first gear wheels out of mesh with the second gear wheels also serving to hold the gear wheels in mesh relation, said shafts having openings therein to receive the forward straps of an automobile top whereby the straps are to be wound on said shaft and guide brackets carried upon the forward part of the automobile and guide the straps on the automobile top.

5. The combination with an automobile having a top pivoted thereon and normally in down position of a pair of bearing brackets secured upon the axles of the automobile, horizontal shafts slidable laterally within the bearing members and rotatable therein, gear wheels keyed on the outer ends of said shafts, gear wheels mounted upon the inner faces of the automobile wheels and coöperating with the first named gear wheels, said automobile top having straps depending from the forward end thereof, said shafts having openings therein to receive said straps, means to hold the first named gear wheels into and out of operative position relative to the wheel carried gear wheels and guide brackets carried by the automobile adjacent to the forward end thereof to guide said straps.

In testimony whereof I affix my signature in presence of two witnesses.

RICHARD MENHENNET.

Witnesses:
EDWARD AUSTIN WATERS,
JAMES A. KELL.

Copies of this patent may be obtained for five cents each, by addressing the "Commissioner of Patents, Washington, D. C."